US011339289B2

(12) United States Patent
Kajiwara et al.

(10) Patent No.: US 11,339,289 B2
(45) Date of Patent: May 24, 2022

(54) POLYIMIDE PRECURSOR SOLUTION AND POLYIMIDE SHAPED ARTICLE

(71) Applicant: FUJIFILM Business Innovation Corp., Tokyo (JP)

(72) Inventors: Kenji Kajiwara, Kanagawa (JP); Wataru Yamada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 178 days.

(21) Appl. No.: 15/916,335

(22) Filed: Mar. 9, 2018

(65) Prior Publication Data

US 2019/0071569 A1    Mar. 7, 2019

(30) Foreign Application Priority Data

Sep. 1, 2017  (JP) .............................. JP2017-168577

(51) Int. Cl.
| | | |
|---|---|---|
| C08L 79/08 | (2006.01) | |
| C08G 73/10 | (2006.01) | |
| G01N 30/88 | (2006.01) | |
| G01N 30/00 | (2006.01) | |
| C08K 5/17 | (2006.01) | |
| C08K 5/3435 | (2006.01) | |
| C08K 5/357 | (2006.01) | |

(52) U.S. Cl.
CPC .......... *C08L 79/08* (2013.01); *C08G 73/1003* (2013.01); *C08G 73/1028* (2013.01); *C08G 73/1032* (2013.01); *C08G 73/1067* (2013.01); *C08G 73/1071* (2013.01); *C08K 5/17* (2013.01); *C08K 5/3435* (2013.01); *C08K 5/357* (2013.01); *G01N 30/88* (2013.01); *G01N 2030/486* (2013.01); *G01N 2030/885* (2013.01)

(58) Field of Classification Search
None
See application file for complete search history.

(56) References Cited

U.S. PATENT DOCUMENTS

| | | | | |
|---|---|---|---|---|
| 3,663,728 | A | * | 5/1972 | Hoback .............. C08G 73/1032 524/714 |
| 4,014,834 | A | | 3/1977 | Concannon |
| 4,238,528 | A | | 12/1980 | Angelo et al. |
| 8,722,758 | B2 | | 5/2014 | Hwang et al. |
| 9,518,189 | B2 | | 12/2016 | Reynolds |
| 9,580,609 | B2 | | 2/2017 | Reynolds |
| 2005/0136245 | A1 | * | 6/2005 | Arita ..................... G03G 7/004 428/323 |
| 2014/0213724 | A1 | | 7/2014 | Miyamoto et al. |
| 2016/0133935 | A1 | * | 5/2016 | Kajita .................... C08G 73/10 429/213 |

FOREIGN PATENT DOCUMENTS

| | | | |
|---|---|---|---|
| CN | 103965625 | A | 8/2014 |
| CN | 106661326 | A | 5/2017 |
| JP | 57-010897 | B2 | 3/1982 |
| JP | 08-015519 | A | 1/1996 |
| JP | 08-059832 | A | 3/1996 |
| JP | 08-120077 | A | 5/1996 |
| JP | 08-157599 | A | 6/1996 |
| JP | 08-291252 | A | 11/1996 |
| JP | 2000-501124 | A | 2/2000 |
| JP | 2003-013351 | A | 1/2003 |
| JP | 2007-333904 | A | 12/2007 |
| JP | 2011-144374 | A | 7/2011 |
| JP | 4789803 | B2 | 10/2011 |
| JP | 2012-036382 | A | 2/2012 |
| JP | 2012-140582 | A | 7/2012 |
| JP | 5099394 | B1 | 12/2012 |
| JP | 2013171793 | A * | 9/2013 |
| JP | 2014-148602 | A | 8/2014 |
| JP | 2014-148604 | A | 8/2014 |
| JP | 2014231545 | A * | 12/2014 |
| JP | 2015-504952 | A | 2/2015 |
| JP | 2015-117258 | A | 6/2015 |
| WO | 2011/115078 | A1 | 9/2011 |
| WO | 2012/008543 | A1 | 1/2012 |
| WO | 2014/196543 | A1 | 12/2014 |

OTHER PUBLICATIONS

Ube (UPIA, Ube Industries Ltd, Copyright 2015, downloaded from https://www.ube.com/upilex/catalog/pdf/upia_e.pdf?20190220 on Jul. 21, 2021) (Year: 2015).*
Notice of Reasons for Refusal dated Apr. 27, 2021 from the Japanese Patent Office in JP Application No. 2017-168577.
Notice of Reasons for Refusal dated Jul. 13, 2021 from the Japanese Patent Office in Japanese Application No. 2017-168577.
Communication dated Oct. 11, 2021 by the Chinese Patent Office in Chinese Application No. 201810383729.X.

* cited by examiner

*Primary Examiner* — Rachel Kahn

(74) *Attorney, Agent, or Firm* — Sughrue Mion, PLLC

(57) ABSTRACT

A polyimide precursor solution contains a polyimide precursor, wherein in the case where the polyimide precursor is analyzed by gel permeation chromatography, the elution curve of the polyimide precursor has a region A including a higher-molecular-weight peak and a region B including a lower-molecular-weight peak; a weight average molecular weight determined from the region A in terms of polystyrene is approximately 10,000 or more, and a weight average molecular weight determined from the region B in terms of polystyrene is approximately less than 10,000; and when the area of the region A is a and the area of the region B is b, the polyimide precursor satisfies Equation (1)

$a/(a+b)$=approximately from 0.70 to 0.98.    Equation 1:

14 Claims, No Drawings

POLYIMIDE PRECURSOR SOLUTION AND POLYIMIDE SHAPED ARTICLE

CROSS-REFERENCE TO RELATED APPLICATIONS

This application is based on and claims priority under 35 USC 119 from Japanese Patent Application No. 2017-168577 filed Sep. 1, 2017.

BACKGROUND

Technical Field

The present invention relates to a polyimide precursor solution and a polyimide shaped article.

SUMMARY

According to an aspect of the invention, there is provided a polyimide precursor solution containing a polyimide precursor, wherein in the case where the polyimide precursor is analyzed by gel permeation chromatography, the elution curve of the polyimide precursor has a region A including a higher-molecular-weight peak and a region B including a lower-molecular-weight peak; a weight average molecular weight determined from the region A in terms of polystyrene is approximately 10,000 or more, and a weight average molecular weight determined from the region B in terms of polystyrene is approximately less than 10,000; and when the area of the region A is a and the area of the region B is b, the polyimide precursor satisfies Equation (1)

$$\text{Equation 1:} \quad a/(a+b) = \text{approximately from 0.70 to 0.98.}$$

DETAILED DESCRIPTION

Exemplary embodiments of the invention will now be described in detail.

Polyimide Precursor Solution

A polyimide precursor solution according to a first exemplary embodiment contains a polyimide precursor, wherein in the case where the polyimide precursor is analyzed by gel permeation chromatography (GPC), the elution curve of the polyimide precursor has a region A including a higher-molecular-weight peak and a region B including a lower-molecular-weight peak; a weight average molecular weight determined from the region A in terms of polystyrene is approximately 10,000 or more, and a weight average molecular weight determined from the region B in terms of polystyrene is approximately less than 10,000; and when the area of the region A is a and the area of the region B is b, the polyimide precursor satisfies Equation (1).

$$\text{Equation 1:} \quad a/(a+b) = \text{approximately from 0.70 to 0.98}$$

In the polyimide precursor solution of the first exemplary embodiment, the elution curve of the polyimide precursor analyzed by GPC has two peaks: a lower-molecular-weight peak and a higher-molecular-weight peak. The percentage of the area a of the region A including the higher-molecular-weight peak and the percentage of the area b of the region B including the lower-molecular-weight peak are as follows.

(1) Area a: the percentage of the area a of the region A from which a weight average molecular weight (Mw) is determined to be approximately 10,000 or more in terms of polystyrene is approximately from 70% to 98% of the whole area in an area percentage (2) Area b: the percentage of the area b of the region B from which a weight average molecular weight (Mw) is determined to be approximately less than 10,000 in terms of polystyrene is approximately from 2% to 30% of the whole area in an area percentage A polyimide shaped article is produced by applying the polyimide precursor solution containing a polyimide precursor to an object to form a coating film and heating the coating film.

In order to enhance resistance to generation of cracks in the polyimide shaped article, the polyimide precursor solution, for example, suitably contains a polyimide precursor having an increased molecular weight. A polyimide precursor solution containing only a polyimide precursor having a high molecular weight is, however, highly viscous. Hence, in the case where such a highly viscous polyimide precursor solution is applied to an object to form a coating film, the coating becomes uneven in some cases. When such an uneven coating film is heated to produce a polyimide shaped article, the uneven thickness brought about by the uneven coating may, for instance, cause the polyimide shaped article to be cracked in some cases. Furthermore, a polyimide shaped article formed of the polyimide precursor having an increased molecular weight has a high molecular weight and therefore becomes unnecessarily hard, which impairs the toughness of the polyimide shaped article. This causes the polyimide shaped article to be cracked in some cases.

A polyimide precursor solution containing only a polyimide precursor having a low molecular weight has a lower viscosity than a polyimide precursor solution containing only a polyimide precursor having a high molecular weight. Hence, in the case where such a polyimide precursor solution containing only a polyimide precursor having a low molecular weight is applied to an object to form a coating film, the occurrence of the uneven coating is reduced. The low molecular weight, however, causes the mechanical strength of a polyimide shaped article to be lowered, which leads to generation of cracks in the polyimide shaped article in some cases.

The polyimide precursor solution of the first exemplary embodiment principally contains a polyimide precursor having a high molecular weight (weight average molecular weight of approximately 10,000 or more) and also contains a small amount of a polyimide precursor having a low molecular weight (weight average molecular weight of approximately less than 10,000). It is presumed that this constitution prevent the viscosity of the polyimide precursor solution from being unnecessarily high and that the occurrence of uneven coating be reduced in a coating film formed by applying the polyimide precursor solution to an object. In addition, the combined use of the polyimide precursor having a high molecular weight with a small amount of the polyimide precursor having a low molecular weight is believed to give flexibility to a polyimide shaped article that is to be produced.

It is speculated that an excess in the amount of the polyimide precursor having a low molecular weight cause an unnecessary increase in the flexibility and therefore lead to a decrease in the mechanical strength of the polyimide shaped article. This is believed to a cause of generation of cracks in the polyimide shaped article. It is speculated that an insufficient amount of the polyimide precursor having a low molecular weight make it difficult to reduce the occurrence of uneven coating and to give flexibility. This is also believed to a cause of generation of cracks in the polyimide shaped article.

Accordingly, the polyimide precursor solution having the above-mentioned constitution according to the first exemplary embodiment is presumed to enable production of a polyimide shaped article in which cracks are less likely to be generated.

A polyimide shaped article made of the polyimide precursor solution of the first exemplary embodiment can be well elongated.

The components of the polyimide precursor solution of the first exemplary embodiment will now be described.

Polyimide Precursor

The polyimide precursor is a resin having a repeating unit represented by General Formula (I) (polyamic acid).

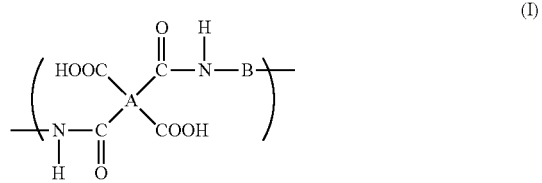

(in General Formula (I), A represents a tetravalent organic group, and B represents a divalent organic group)

The tetravalent organic group represented by A in General Formula (I) is a residue of tetracarboxylic dianhydride as a raw material from which four carboxyl groups have been removed.

The divalent organic group represented by B is a residue of a diamine compound as a raw material from which two amino groups have been removed.

In particular, the polyimide precursor having a repeating unit represented by General Formula (I) is a polymer of tetracarboxylic dianhydride and a diamine compound.

The tetracarboxylic dianhydride may be either an aromatic compound or an aliphatic compound and is suitably an aromatic compound. In other words, the tetravalent organic group represented by A in General Formula (I) is suitably an aromatic organic group.

Examples of the aromatic tetracarboxylic dianhydride include pyromelletic dianhydride, 3,3',4,4'-benzophenone tetracarboxylic dianhydride, 3,3',4,4'-biphenyl sulfone tetracarboxylic dianhydride, 1,4,5,8-naphthalene tetracarboxylic dianhydride, 2,3,6,7-naphthalene tetracarboxylic dianhydride, 3,3',4,4'-biphenyl ether tetracarboxylic dianhydride, 3,3',4,4'-dimethyl-diphenylsilane tetracarboxylic dianhydride, 3,3',4,4'-tetra phenylsilane tetracarboxylic dianhydride, 1,2,3,4-furan tetracarboxylic dianhydride, 4,4'-bis(3,4-dicarboxy phenoxy) diphenyl sulfide dianhydride, 4,4'-bis (3,4-dicarboxy phenoxy)diphenyl sulfone dianhydride, 4,4'-bis (3,4-dicarboxy phenoxy)diphenyl propane dianhydride, 3,3',4,4'-perfluoro isopropylidenediphthalic dianhydride, 3,3',4,4'-biphenyl tetracarboxylic dianhydride, 2,3,3',4'-biphenyl tetracarboxylic dianhydride, bis(phthalic acid) phenylphosphine oxide dianhydride, p-phenylene-bis(triphenyl phthalic acid) dianhydride, m-phenylene-bis(triphenyl phthalic acid) dianhydride, bis (triphenyl phthalic acid)-4,4'-diphenyl ether dianhydride, bis(triphenyl phthalic acid)-4,4'-diphenylmethane dianhydride, and 4,4'-oxydiphthalic dianhydride.

Examples of the aliphatic tetracarboxylic dianhydride include aliphatic or alicyclic tetracarboxylic dianhydride such as butane tetracarboxylic dianhydride, 1,2,3,4-cyclobutane tetracarboxylic dianhydride, 1,3-dimethyl-1,2,3,4-cyclobutane tetracarboxylic dianhydride, 1,2,3,4-cyclopentane tetracarboxylic dianhydride, 2,3,5-tricarboxycyclopentyl acetic acid dianhydride, 3,5,6-tricarboxynorbornane-2-acetic acid dianhydride, 2,3,4,5-tetrahydrofuran tetracarboxylic dianhydride, 5-(2,5-di-oxo-tetrahydrofuryl)-3-methyl-3-cyclohexene-1,2-dicarboxylic acid dianhydride, and bicyclo[2,2,2]-oct-7-ene-2,3,5,6-tetracarboxylic dianhydride and aliphatic tetracarboxylic dianhydride having an aromatic ring, such as 1,3,3a,4,5,9b-hexahydro-2,5-dioxo-3-furanyl)-naphtho[1,2-c]furan-1,3-dione, 1,3,3a,4,5,9b-hexahydro-5-methyl-5-(tetrahydro-2,5-dioxo-3-furanyl)-naphtho[1,2-c]furan-1,3-dione, and 1,3,3a,4,5,9b-hexahydro-8-methyl-5-(tetrahydro-2,5-dioxo-3-furanyl)-naphtho[1,2-c]furan-1,3-dione.

Among these substances, aromatic tetracarboxylic dianhydride may be used as tetracarboxylic dianhydride. Specifically, for example, pyromelletic dianhydride, 3,3',4,4'-biphenyl tetracarboxylic dianhydride, 2,3,3',4'-biphenyl tetracarboxylic dianhydride, 3,3',4,4'-biphenyl ether tetracarboxylic dianhydride, 3,3',4,4'-benzophenone tetracarboxylic dianhydride, and 4,4'-oxydiphthalic dianhydride may be used. In particular, pyromelletic dianhydride, 3,3',4,4'-biphenyl tetracarboxylic dianhydride, 3,3',4,4'-benzophenone tetracarboxylic dianhydride, and 4,4'-oxydiphthalic dianhydride may be used. Especially, 3,3',4,4'-biphenyl tetracarboxylic dianhydride may be used.

The tetracarboxylic dianhydrides may be used alone or in combination.

In the case where the tetracarboxylic dianhydrides are used in combination, either aromatic tetracarboxylic dianhydrides or aliphatic tetracarboxylic acids may be used in combination; alternatively, an aromatic tetracarboxylic dianhydride may be used in combination with an aliphatic tetracarboxylic dianhydride.

The diamine compound is a diamine compound having two amino groups in its molecular structure. The diamine compound may be either an aromatic compound or an aliphatic compound and is suitably an aromatic compound. In other words, the divalent organic group represented by B in General Formula (I) is suitably an aromatic organic group.

Examples of the diamine compound include aromatic diamine such as p-phenylenediamine, m-phenylenediamine, 4,4'-diaminodiphenylmethane, 4,4'-diaminodiphenyl ethane, 4,4'-diaminodiphenyl ether, 4,4'-diaminodiphenyl sulfide, 4,4'-diamino-diphenyl sulfone, 1,5-diamino-napthalene, 3,3-dimethyl-4,4'-diamine biphenyl, 5-amino-1-(4'-aminophenyl)-1,3,3-trimethylindane, 6-amino-1-(4'-aminophenyl)-1,3,3-trimethylindane, 4,4'-diaminobenzanilide, 3,5-diamino-3'-trifluoromethylbenzanilide, 3,5-diamino-4'-trifluoromethylbenzanilide, 3,4'-diaminophenyl ether, 2,7-diaminofluorene, 2,2-bis(4-aminophenyl) hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 2,2-bis[4-(4-aminophenoxy)phenyl]propane, 2,2-bis[4-(4-aminophenoxy)phenyl]hexafluoropropane, 1,4-bis(4-aminophenoxy)benzene, 4,4'-bis(4-aminophenoxy)biphenyl, 1,3'-bis(4-aminophenoxy)benzene, 9,9-bis(4-aminophenyl)fluorene, 4,4'-(p-phenylene isopropylidene) bisaniline, 4,4'-(m-phenylene isopropylidene)bisaniline, 2,2'-bis[4-(4-amino-2-trifluoromethylphenoxy)phenyl] hexafluoropropane, and 4,4'-bis[4-(4-amino-2-trifluoromethyl)phenoxy]-octafluorobiphenyl; aromatic diamine having two amino groups bonded to an aromatic ring and a hetero atom other than the nitrogen atoms of the amino groups, such as diaminotetraphenyl thiophene; and aliphatic diamine and alicyclic diamine such as 1,1-metaxylylene diamine, 1,3-propane diamine, tetramethylene diamine, pentamethylene diamine, octamethylene diamine, nonamethylene diamine, 4,4-diaminoheptamethylene diamine, 1,4-diamino cyclohexane, isophorone diamine, tetrahydrodicyclopentadienylene diamine, hexahydro-4,7-methanoindanylene dimethylene diamine, trycyclo[6,2,1,0$^{2.7}$]-undecylene dimethyl diamine, and 4,4'-methylenebis(cyclohexylamine).

Among these substances, aromatic diamine compounds may be used as the diamine compound. Specifically, for example, p-phenylenediamine, m-phenylenediamine, 4,4'-diaminodiphenylmethane, 4,4'-diaminodiphenyl ether, 3,4-diaminodiphenyl ether, 4,4'-diaminodiphenyl sulfide, and 4,4'-diaminodiphenyl sulfone may be used. Especially, 4,4'-diaminodiphenyl ether and p-phenylenediamine may be used.

The diamine compounds may be used alone or in combination. In the case where the diamine compounds are used in combination, either aromatic diamine compounds or aliphatic diamine compounds may be used in combination; alternatively, an aromatic diamine compound may be used in combination with an aliphatic diamine compound.

The polyimide precursor may be suitably a resin of which the degree of imidization is 0.2 or less. In other words, the polyimide precursor may be a partially imidized resin.

In particular, specific examples of the polyimide precursor include resins having repeating units represented by General Formulae (I-1), (I-2), and (I-3).

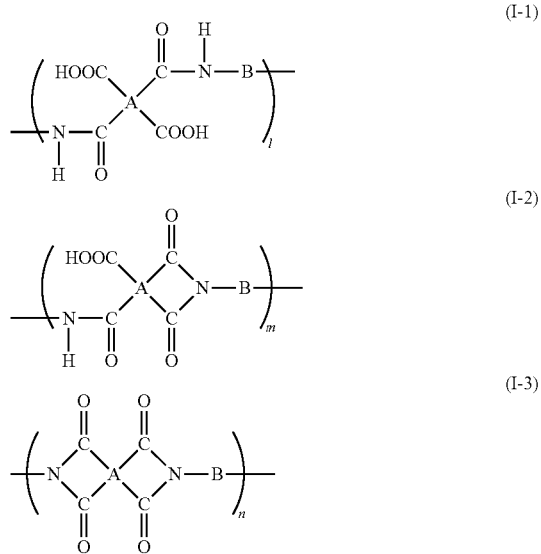

In General Formulae (I-1), (I-2), and (I-3), A represents a tetravalent organic group, and B represents a divalent organic group. A and B have the same definitions as A and B in General Formula (I).

l is an integer of 1 or more, and m and n each independently represent an integer of 0 or 1 or more.

In the bonding parts of the polyimide precursor (site of reaction of tetracarboxylic dianhydride with diamine compound), the proportion of the number of bonding parts with imide ring closure (2n+m) to the number of all of the bonding parts (2l+2m+2n), namely the degree of imidization of the polyimide precursor, is represented by "(2n+m)/(2l+2m+2n)". The degree of imidization is preferably 0.2 or less, more preferably 0.15 or less, and most preferably 0.1 or less.

The degree of imidization in such a range enables reductions in gelation of the polyimide precursor and the occurrence of precipitation in the polyimide precursor.

The degree of imidization of the polyimide precursor (value calculated from "(2n+m)/(2l+2m+2n)" is determined as follows.

Determination of Degree of Imidization of Polyimide Precursor

Preparation of Sample of Polyimide Precursor (i) A polyimide precursor solution to be analyzed is applied onto a silicon wafer in a thickness ranging from 1 μm to 10 μm to produce a sample of a coating film.

(ii) The sample of a coating film is immersed into tetrahydrofuran (THF) for 20 minutes to convert the solvent in the sample into THF. The solvent used for the immersion is not limited to THF, and any solvent can be used provided that it does not dissolve the polyimide precursor and is miscible with the solvent contained in the polyimide precursor solution. Specifically, alcohol solvents, such as methanol and ethanol, and ether compounds, such as dioxane, can be used.

(iii) The sample of a coating film is retrieved from THF, and the surface of the sample is blown with $N_2$ gas to remove THF remaining thereon. The sample of a coating is dried over 12 hours or longer at a temperature ranging from 5° C. to 25° C. under reduced pressure of 10 mmHg or less, thereby producing a sample of the polyimide precursor.

Preparation of 100%-Imidized Standard Sample (iv) A polyimide precursor solution to be analyzed is applied onto a silicon wafer to produce a sample of a coating film as in the procedure (i).

(v) The sample of a coating film is heated at 380° C. for 60 minutes for imidization to produce a 100%-imidized standard sample.

Measurement and Analysis (vi) The 100%-imidized standard sample and the sample of the polyimide precursor are subjected to measurement of infrared absorption spectra with a Fourier transform infrared spectrophotometer (FT-730 manufactured by HORIBA, Ltd.). A ratio I'(100) of the absorption peak for a wavelength of near 1780 cm$^{-1}$ [Ab' (1780 cm$^{-1}$)], which is derived from an imide bond, to the absorption peak for a wavelength of near 1500 cm$^{-1}$ [Ab' (1500 cm$^{-1}$)], which is derived from an aromatic ring, is determined in the 100%-imidized standard sample.

(vii) The sample of the polyimide precursor is similarly subjected to the analyzation to determine a ratio I(x) of the absorption peak for a wavelength of near 1780 cm$^{-1}$ [Ab (1780 cm$^{-1}$)], which is derived from an imide bond, to the absorption peak for a wavelength of near 1500 cm$^{-1}$ [Ab (1500 cm$^{-1}$)], which is derived from an aromatic ring.

From the determined absorption peaks I'(100) and I(x), the degree of imidization of the polyimide precursor is calculated on the basis of the following equations.

Degree of imidization of polyimide precursor=$I(x)/I'(100)$    Equation:

$I'(100)=[Ab'(1780\ cm^{-1})]/[Ab'(1500\ cm^{-1})]$    Equation:

$I(x)=[Ab(1780\ cm^{-1})]/[Ab(1500\ cm^{-1})]$    Equation:

This determination of the degree of imidization of the polyimide precursor is applied to determine the degree of imidization of an aromatic polyimide precursor. In order to determine the degree of imidization of an aliphatic polyimide precursor, the absorption peak derived from a structure that does not change through the imidization is used as the internal standard peak in place of the absorption peak derived from an aromatic ring.

Terminal Amino Group of Polyimide Precursor

The polyimide precursor may include a polyimide precursor (resin) having an amino group at its end and is suitably a polyimide precursor having an amino group at each terminal.

In order to allow the polyimide precursor to have an amino group at its molecular terminal, the molar equivalent of the diamine compound used in the polymerization, for example, is in excess of the molar equivalent of the tetracarboxylic dianhydride. When the molar equivalent of the diamine compound is 1, the proportion of the molar equivalent of the tetracarboxylic dianhydride to that of the diamine compound is preferably from 0.9 to 0.9999, and more preferably from 0.93 to 0.999.

In the case where the proportion of the molar equivalent of the tetracarboxylic dianhydride to that of the diamine compound is 0.9 or more, the closer the proportion is to 0.9, the greater the effect of the amino group existing at the molecular terminal of the polyimide precursor is; in particular, good dispersibility can be easily produced. In the case where the proportion of the molar equivalent is 0.9999 or less, the closer the proportion is to 0.9999, the larger the molecular weight of a polyimide precursor to be produced is; for example, when such a polyimide precursor is formed into a layered (film-like) polyimide shaped article, it is likely to have a sufficient strength (tear strength and tensile strength).

The terminal amino group of the polyimide precursor can be detected by the effect of trifluoroacetic anhydride (which quantitatively reacts with the amino group) on the polyimide precursor solution. In particular, the terminal amino group of the polyimide precursor is trifluoroacetylated with trifluoroacetic anhydride. After the trifluoroacetylation, the polyimide precursor is purified by reprecipitation or another process to remove excessive trifluoroacetic anhydride and a residue of trifluoroacetic acid. The resulting polyimide precursor is analyzed by a nuclear magnetic resonance method (19F-NMR) to determine the quantity of fluorine atoms introduced to the polyimide precursor, thereby determining the quantity of the terminal amino group of the polyimide precursor.

The weight average molecular weight of the whole polyimide precursor is preferably from 20,000 to 200,000, more preferably from 30,000 to 150,000, and further preferably from 50,000 to 130,000.

The term "weight average molecular weight of the whole polyimide precursor" refers to the weight average molecular weight in the whole region including the region A with the higher-molecular-weight peak and the region B with the lower-molecular-weight peak.

The weight average molecular weight of the whole polyimide precursor in such a range enables the polyimide precursor to be well soluble in a composition and contributes to good mechanical strength of a film formed of the polyimide precursor.

The weight average molecular weight of the polyimide precursor is measured by gel permeation chromatography (GPC) under the following conditions.

Column: TSKgel α-M (7.8 mm I.D×30 cm, manufactured by Tosoh Corporation)
Eluent: Dimethylformamide (DMF)/30 mM of LiBr/60 mM of phosphoric acid
Flow rate: 0.6 mL/min
Injection volume: 60 µL
Detector: Refractive index (RI) detector In the polyimide precursor solution of the first exemplary embodiment, the elution curve of the polyimide precursor analyzed by GPC has two peaks: a lower-molecular-weight peak and a higher-molecular-weight peak. The weight average molecular weight determined from the region A including the higher-molecular-weight peak is approximately 10,000 or more in terms of polystyrene. The weight average molecular weight determined from the region B including the lower-molecular-weight peak is approximately less than 10,000 in terms of polystyrene. The proportion of the area a of the region A to the total of the area a of the region A and the area b of the region B is approximately from 0.70 to 0.98 [a/(a+b)=approximately from 0.70 to 0.98].

The proportion of the area a of the region A to the total of the area a of the region A and the area b of the region B [a/(a+b), also referred to as "GPC peak area proportion"] is suitably 0.71 or more and less than 0.98, preferably approximately from 0.71 to 0.95, more preferably from 0.72 to 0.94, and further preferably approximately from 0.73 to 0.93 because such a proportion enables a reduction in generation of cracks in a polyimide shaped article.

The weight average molecular weight determined from the region A including the higher-molecular-weight peak is from 10,000 to 200,000 in terms of polystyrene. The weight average molecular weight determined from the region B including the lower-molecular-weight peak is approximately 1,000 or more and less than 10,000 in terms of polystyrene.

The area a of the region A and the area b of the region B are measured as follows.

A polyimide precursor solution to be analyzed is prepared. The polyimide precursor in the polyimide precursor solution is analyzed by GPC under the above-mentioned conditions. An elution curve is obtained from the analysis by GPC. From the elution curve, the higher-molecular-weight region A and the lower-molecular-weight region B are defined. Weight average molecular weights are determined from the higher-molecular-weight region A and the lower-molecular-weight region B in terms of polystyrene. The area a of the higher-molecular-weight region A and the area b of the lower-molecular-weight region B are determined to calculate a GPC peak area proportion [a/(a+b)].

A polyimide precursor solution having a GPC peak area proportion ranging approximately from 0.70 to 0.98 is, for example, obtained by mixing two polyimide precursor solutions having different molecular weights, which are produced through the below process for producing a polyimide precursor solution, with each other. Specifically, the conditions of the polymerization of the polyimide precursor, such as polymerization temperature and reaction time, are adjusted to prepare a first polyimide precursor solution having a weight average molecular weight of approximately 10,000 or more and a second polyimide precursor solution having a weight average molecular weight of approximately less than 10,000. Then, the first polyimide precursor solution and the second polyimide precursor solution are properly mixed with each other such that a GPC peak area proportion is approximately from 0.70 to 0.98.

The amount (concentration) of the polyimide precursor is properly from 0.1 weight % to 40 weight %, preferably from 0.5 weight % to 25 weight %, and more preferably from 1 weight % to 20 weight % relative to the whole polyimide precursor solution.

Organic Amine Compound

The polyimide precursor solution of the first exemplary embodiment may contain an organic amine compound.

The organic amine compound is a compound that serves to convert the polyimide precursor (carboxyl group thereof)

into an amine salt to enhance the solubility thereof in a solvent and that functions to promote imidization. The organic amine compound may be a compound except the diamine compound that is a raw material of the polyimide precursor.

The organic amine compound may be a water-soluble compound. The term "water-soluble" herein refers to the following: in the case where a substance can be dissolved in water in an amount of 1 weight % or more at 25° C., this substance is water-soluble.

The organic amine compound may have any molecular skeleton, and it may be either acyclic or cyclic (monocyclic or polycyclic). The organic amine compound may be either an aliphatic or aromatic amine compound in terms of its molecular skeleton and is suitably an aliphatic amine compound. The organic amine compound may be an amine compound containing a functional group with a hetero element on its molecular skeleton or as a substituent. The organic amine compound is, for example, also suitably an aliphatic or aromatic cyclic amine compound having a heterocyclic structure containing nitrogen.

In terms of the structure of a molecular skeleton, suitable examples of the organic amine compound include linear or branched aliphatic amines, imidazole compounds, and alicyclic amine compounds.

The organic amine compound may be either a primary amine compound, a secondary amine compound, or a tertiary amine compound. In particular, the organic amine compound may be at least one selected from a secondary amine compound and a tertiary amine compound (particularly tertiary amine compound). Using a tertiary amine compound or a secondary amine compound (particularly tertiary amine compound) as the organic amine compound enables an easy enhancement in the solubility of the polyimide precursor in a solvent containing water.

The organic amine compound is suitably a tertiary amine compound particularly because it enables a reduction in the occurrence of cracks. A tertiary amine compound used in the polyimide precursor solution of the first exemplary embodiment serves as a dehydration catalyst. Such a tertiary amine compound also functions to promote re-polymerization of a polyimide precursor having a low molecular weight in a heating process and to apparently cross-link high-molecular-weight polyimide precursors to each other on the low-molecular-weight polyimide precursor as a base point (simply referred to as "cross-linking effect"). It is presumed that the occurrence of cracks be therefore reduced in a polyimide shaped article. This effect is produced when the polyimide precursor solution contains a polyimide precursor having a high molecular weight and a polyimide precursor having a low molecular weight so as to have the above-mentioned GPC peak area proportion. In the case where the polyimide precursor having a high molecular weight is in excess, the content percentage of the polyimide precursor having a low molecular weight is too small, which impairs effect of cross-linking the polyimide precursors having a high molecular weight to each other. In the case where the polyimide precursor having a low molecular weight is in excess, the amount of the polyimide precursor having a high molecular weight is too small; thus, even if the effect of cross-linking the polyimide precursors having a high molecular weight to each other is produced, the occurrence of cracks is less likely to reduced.

Examples of the organic amine compound include aminoalkyl alcohols (amine compounds having an aminoalkyl alcohol skeleton), isoquinolines (amine compounds having an isoquinoline skeleton), pyridines (amine compounds having a pyridine skeleton), pyrimidines (amine compounds having a pyrimidine skeleton), pyrazines (amine compounds having a pyrazine skeleton), piperazines (amine compounds having a piperazine skeleton), piperidines (amine compounds having a piperidine skeleton), triazines (amine compounds having a triazine skeleton), imidazoles (amine compounds having a imidazole skeleton), morpholines (amine compounds having a morpholine skeleton), 1,4-diazabicyclo[2.2.2]octane (DABCO), polyaniline, and polypyridine.

Examples of the primary amine compound include methylamine, ethylamine, n-propylamine, isopropylamine, 2-ethanolamine, and 2-amino-2-methyl-1-propanol.

Examples of the secondary amine compound include dimethylamine, 2-(methylamino)ethanol, 2-(ethylamino)ethanol, and morpholine.

Examples of the tertiary amine compound include 2-dimethylaminoethanol, 2-diethylaminoethanol, 2-dimethylaminopropanol, pyridine, triethylamine, picoline, N-methylmorpholine, N-ethylmorpholine, 1,2-dimethylimidazole, 2-ethyl-4-methylimidazole, N-methylpiperidine, N-ethylpiperidine, and 4-hydroxymethylpiperidine.

Among the tertiary amine compounds, at least one selected from the group consisting of aminoalkyl alcohols (amine compounds having an aminoalkyl alcohol skeleton), such as 2-dimethylaminoethanol; morpholines (amine compounds having a morpholine skeleton), such as N-methylmorpholine; and piperidines (amine compounds having a piperidine skeleton), such as 4-hydroxymethylpiperidine is suitably used. In particular, at least one selected from the group consisting of 2-dimethylaminoethanol, N-methylmorpholine, and 4-hydroxymethylpiperidine is further suitably used.

The organic amine compound is suitably a compound having a boiling point of 60° C. or more (preferably from 60° C. to 200° C., more preferably from 70° C. to 150° C.)

In the case where the solvent contains water (such as solvent containing 50 weight % or more of water, also referred to as "aqueous solvent"), the organic amine compound having a boiling point of 60° C. or more is less likely to volatilize from the polyimide precursor solution during storage thereof, so that a reduction in the solubility of the polyimide precursor in the aqueous solvent can be easily suppressed.

The organic amine compound content is suitably from 50 mol % to 500 mol %, preferably from 80 mol % to 400 mol %, and more preferably from 100 mol % to 300 mol % relative to the carboxyl group content in the polyimide precursor.

Solvent

Examples of the solvent include organic solvents. Specific examples thereof include sulfoxide solvents such as dimethyl sulfoxide and diethyl sulfoxide; formamide solvents such as N,N-dimethylformamide and N,N-diethylformamide; acetamide solvents such as N,N-dimethylacetamide (DMAc) and N,N-diethylacetamide; pyrrolidone solvents such as N-methyl-2-pyrrolidone (NMP) and N-vinyl-2-pyrrolidone; phenol solvents such as phenol, o-, m-, or p-cresol, xylenol, halogenated phenol, and catechol; ether solvents such as tetrahydrofuran (THF), dioxane, and dioxolane; alcohol solvents such as methanol, ethanol, and butanol; cellosolve solvents such as butyl cellosolve; urea solvents such as 1,3-dimethylurea, 1,3-diethylurea, 1,3-diphenylurea, 1,3-dicyclohexylurea, tetramethylurea, tetraethylurea, 2-imidazolidinone, propylene urea, 1,3-dimethyl-2-imidazolidinone, and N,N-dimethylpropyleneurea; and hexamethylphosphoramide and γ-butyrolactone. These solvents may be used alone or in combination.

Among these solvents, in particular, pyrrolidone solvents such as N-methyl-2-pyrrolidone and N-vinyl-2-pyrrolidone, formamide solvents such as N,N-dimethylacetamide, ether solvents such as tetrahydrofuran, and urea solvents such as 1,3-dimethyl-2-imidazolidinone are suitable.

The solvent may contain water in addition to the organic solvent. In the case where the solvent contains water, the water content is suitably from 10 weight % to 95 weight % (preferably from 40 weight % to 70 weight %) relative to the whole solvent (total of the organic solvent and water). In the case where the solvent contains water, the solvent may be, for instance, a mixed solvent of water with any of organic solvents including pyrrolidone solvents such as N-methyl-2-pyrrolidone and N-vinyl-2-pyrrolidone, formamide solvents such as N,N-dimethylacetamide, ether solvents such as tetrahydrofuran, and urea solvents such as 1,3-dimethyl-2-imidazolidinone.

Other Additives

The polyimide precursor solution of the first exemplary embodiment may contain a variety of fillers in order to give various properties, such as conductivity and mechanical strength, to a polyimide shaped article to be formed of the polyimide precursor solution. Furthermore, the polyimide precursor solution may contain a catalyst for promoting imidization and a leveling agent for improving the quality of a film to be formed.

Such a conductive material used for imparting conductivity may be a conductive material (for example, having a volume resistivity of less than $10^7 \Omega \cdot cm$, the same holds true for the following description) or a semiconductive material (for example, having a volume resistivity ranging from $10^7 \Omega \cdot cm$ to $10^{13} \Omega \cdot cm$, the same holds true for the following description). These materials are selected on the basis of the intended use.

Examples of the conductive material include carbon blacks (such as acidic carbon black having a pH of 5.0 or less), metals (such as aluminum and nickel), metal oxides (such as yttrium oxide and tin oxide), ion conductive materials (such as potassium titanate and LiCl), and conductive polymers (such as polyaniline, polypyrrole, polysulfone, and polyacetylene). Among these, carbon blacks are suitable in view of dispersion stability in liquid and a price.

These conductive materials may be used alone or in combination.

In the case where such a conductive material is in the form of particles, the particles suitably have a primary particle size of less than 10 μm, and preferably 1 μm or less.

Examples of the fillers used for enhancing mechanical strength include particulate materials such as silica powder, alumina powder, barium sulfate powder, titanium oxide powder, mica, and talc. In order to improve the water repellency and releasability of the surface of a polyimide shaped article, for example, powder of a fluororesin, such as polytetrafluoroethylene (PTFE) or a tetrafluoroethylene perfluoroalkyl vinyl ether copolymer (PFA), may be used.

The catalyst for promoting imidization may be a dehydrating agent, such as acid anhydride, or an acid catalyst such as a phenol derivative, a sulfonic acid derivative, or a benzoic acid derivative.

In order to enhance the quality of the film of a polyimide shaped article, a surfactant may be used. The surfactant may be either a cationic surfactant, an anionic surfactant, or a nonionic surfactant.

The amounts of such other additives are determined on the basis of the intended use of a polyimide shaped article to be produced.

Process for Producing Polyimide Precursor Solution

A process for producing the polyimide precursor solution of the first exemplary embodiment is not particularly limited. Examples thereof are as follows.

(A) Tetracarboxylic dianhydride is polymerized with a diamine compound in an organic solvent to produce a polyimide precursor having a repeating unit represented by General Formula (I)

(B) Tetracarboxylic dianhydride is polymerized with a diamine compound in a solvent (organic solvent or mixed solvent of organic solvent with water) in the presence of an organic amine compound to produce a polyimide precursor having a repeating unit represented by General Formula (I)

(C) Tetracarboxylic dianhydride is polymerized with a diamine compound in an organic solvent to produce a polyimide precursor having a repeating unit represented by General Formula (I), and then an organic amine compound is added thereto after solvent displacement is carried out to substitute the organic solvent with a mixed solvent of an organic solvent with water (such as aqueous solvent) or at the same time as the solvent displacement.

Any of the processes (A) to (C) is used to prepare a first polyimide precursor solution having a weight average molecular weight of approximately 10,000 or more and a second polyimide precursor solution having a weight average molecular weight of approximately less than 10,000. The first and second polyimide precursor solutions are mixed with each other such that the above-mentioned GPC peak area proportion represented by [a/(a+b)] is approximately from 0.70 to 0.98.

Among the processes (A) to (C) for producing the polyimide precursor solution, the processes (B) and (C) involving use of an organic amine compound are suitable because they enable a reduction in the occurrence of cracks in a polyimide shaped article.

The organic solvent is not particularly limited provided that it enables production of a polyimide precursor through polymerization; examples thereof include the above-mentioned polar aprotic solvents (such as γ-butyrolactone, DMAc, and NMP) and a mixed solvent of THF with methanol. Examples of the mixed solvent of an organic solvent with water include mixed solvents of an organic solvent, such as NMP, with water and mixed solvents of THF with water.

Examples of the solvent displacement include a process that involves distilling off the initial solvent by heating or reducing pressure and then adding a specific aqueous solvent thereto and a process that involves temporarily retrieving solid of the polyimide precursor by reprecipitation and then adding a specific aqueous solvent thereto. In each of the processes, drying may be optionally performed before the addition of the specific aqueous solvent.

The reaction temperature in the polymerization reaction of the polyimide precursor may be, for example from 0° C. to 70° C., preferably from 10° C. to 60° C., and more preferably from 20° C. to 55° C. The reaction temperature of 0° C. or more promotes the polymerization reaction and therefore shortens the time taken for the reaction, which leads to an easy enhancement in productivity. The reaction temperature of 70° C. or less reduces the progress of the imidization caused in the molecules of a generated polyimide precursor, which enables easy reductions in precipitation or gelation brought about by impaired solubility of the polyimide precursor.

The duration of the polymerization reaction of the polyimide precursor may be from 1 hour to 24 hours depending on the reaction temperature.

The polyimide precursor having a weight average molecular weight of approximately less than 10,000 and the polyimide precursor having a weight average molecular weight of approximately 10,000 or more can be produced by adjusting the reaction temperature and the reaction time.

Examples of Use of Polyimide Precursor Solution

The polyimide precursor solution of the first exemplary embodiment is used as a coating liquid for forming a polyimide shaped article. Examples of the coating liquid for forming a polyimide shaped article include a coating liquid for forming a polyimide film and a coating liquid for forming a polyimide coating film. Such coating liquids are used to form a polyimide film or polyimide coating film as a polyimide shaped article.

Polyimide Shaped Article

The polyimide shaped article according to a second exemplary embodiment is a shaped article that is a thermally cured product of the polyimide precursor solution of the first exemplary embodiment. In other words, the polyimide shaped article is a cured product formed by heating the polyimide precursor solution. In particular, a coating film of the polyimide precursor solution of the first exemplary embodiment is dried and imidized by being heated to produce the polyimide shaped article of the second exemplary embodiment.

The thickness of the polyimide shaped article may be determined on the basis of the intended use. The lower limit of the thickness is, for instance, at least 5 µm. In the case where the thickness of the polyimide shaped article is from 5 µm to 300 µm, the shaped article is likely to have a good in-plane uniformity, thickness uniformity, and uniformity of physical properties in the thickness direction.

Examples of the polyimide film as the polyimide shaped article include flexible electronic substrate films, copper-clad laminate films, laminate films, electrically insulating films, porous films used in fuel cells, and separation films.

Examples of the polyimide coating film as the polyimide shaped article include insulating films, heat-resistant films, IC packages, adhesive films, liquid crystal alignment films, resist films, planarization films, microlens array films, electric wire coating films, and optical fiber coating films.

Another example of the polyimide shaped article is a belt member. Examples of the belt member include driving belts (for instance, endless belts used as a driving belt) and belts used in electrophotographic image forming apparatuses (for instance, endless belts such as an intermediate transfer belt, a transfer belt, a fixing belt, and a transport belt).

Process for Producing Polyimide Shaped Article

The polyimide shaped article of the second exemplary embodiment is, for example, produced by applying the polyimide precursor solution of the first exemplary embodiment onto a substrate to form a coating film and then heating the coating film. The polyimide shaped article formed of the polyimide precursor solution is not particularly limited.

A process for producing an endless belt that is an example of the polyimide shaped article of the second exemplary embodiment will now be described in detail.

A process for producing an endless belt, for example, includes applying the polyimide precursor solution to a cylindrical substrate to form a coating film, drying the coating film formed on the substrate to form a dried film, subjecting the dried film to an imidizing treatment (heating) for imidization of the polyimide precursor to form a polyimide resin layer, and removing the polyimide resin layer from the substrate to complete the endless belt. The process is specifically as follows.

The polyimide precursor solution is applied to the inner surface or outer surface of the cylindrical substrate to form a coating film. The cylindrical substrate is, for example, suitably a cylindrical metal substrate. Instead of the metal substrate, a resin substrate, a glass substrate, a ceramic substrate, or a substrate of another material may be used. The surface of the substrate may be coated with glass or ceramic, or a release agent involving silicone or fluorine may be applied to the surface.

In order to precisely apply the polyimide precursor solution, the polyimide precursor solution is suitably degassed before being applied. Degassing the polyimide precursor solution enables reductions in generation of bubbles in the application and formation of a defective coating film.

The polyimide precursor solution can be degassed by reducing pressure or centrifugation, and reducing pressure is appropriate because it is simple but gives a great degassing effect.

The cylindrical substrate on which the coating film of the polyimide precursor solution has been formed is left under heating or vacuum to dry the coating film, thereby forming a dried film. In particular, 30 weight % or more, suitably 50 weight % or more of the solvent content is volatilized.

Then, the dried film is subjected to an imidizing treatment (heating). Through this process, a polyimide resin layer is formed.

The heating for the imidization is, for instance, performed at a temperature ranging from 150° C. to 400° C. (suitably from 200° C. to 300° C.) for from 20 minutes to 60 minutes to induce the imidization, thereby forming a polyimide resin layer. In the heating, the temperature may be increased stepwise or gradually increased at a certain rate before the temperature reaches the final phase. The temperature for the imidization differs, for example, depending on the types of tetracarboxylic dianhydride and diamine used as the raw materials. Since insufficient imidization brings poor mechanical properties and poor electric properties, the temperature is adjusted so as to complete the imidization.

Then, the polyimide resin layer is removed from the cylindrical substrate to obtain the endless belt.

In the case where the polyimide shaped article is used as an endless belt for an intermediate transfer belt, the common logarithm value of the surface resistivity of the outer surface thereof is preferably from 8 (Log $\Omega/\square$) to 13 (Log $\Omega/\square$), and more preferably from 8 (Log $\Omega/\square$) to 12 (Log $\Omega/\square$). In the case where the common logarithm value of the surface resistivity is greater than 13 (Log $\Omega/\square$), a recording medium and an intermediate transfer body electrostatically adhere to each other in a second transfer process, and the recording medium is hard to be separated in some cases. In the case where the common logarithm value of the surface resistivity is less than 8 (Log $\Omega/\square$), a toner image subjected to first transfer to the intermediate transfer body is insufficiently held, and defective image quality, such as poor granularity or distortion, may occur.

The common logarithm value of the surface resistivity is controlled on the basis of the type and amount of a conductive material to be used.

EXAMPLES

Examples of exemplary embodiments of the invention will now be described, but the exemplary embodiments are not limited thereto at all.

Examples 1 to 5

Production of Polyimide Precursor Solutions (PAA-1) to (PAA-5)

Into a flask equipped with a stirring rod and a thermometer, 131.57 g of NMP is put. Then, 15.02 g (7.5 mmol) of 4,4'-diaminodiphenyl ether (ODA) (molecular weight: 200.24) and 21.85 g (7.4 mmol) of 3,3',4,4'-biphenyl tetracarboxylic dianhydride (BPDA) (molecular weight: 294.22) are added thereto. The content is stirred for 3 hours for dissolution and a reaction while the reaction temperature is maintained to be 50° C., thereby producing a low-molecular-weight polyimide precursor solution having a weight average molecular weight of less than 10,000.

Likewise, 131.57 g of NMP is put into a flask equipped with a stirring rod and a thermometer. Then, 15.02 g (7.5 mmol) of 4,4'-diaminodiphenyl ether (molecular weight: 200.24) and 21.85 g (7.4 mmol) of 3,3',4,4'-biphenyl tetracarboxylic dianhydride (molecular weight: 294.22) are added thereto. The content is stirred for 24 hours for dissolution and a reaction while the reaction temperature is maintained to be 50° C., thereby producing a high-molecular-weight polyimide precursor solution having a weight average molecular weight of 10,000 or more.

These solutions are mixed with each other so as to produce GPC peak area proportions shown in Table 1, thereby producing polyimide precursor solutions (PAA-1) to (PAA-5).

Examples 6 to 8

Production of Polyimide Precursor (PAA-6)

Into a flask equipped with a stirring rod and a thermometer, 131.57 g of a mixed solvent of water with NMP (water/NMP=65.78 g/65.78 g) is put. Then, 15.02 g (7.5 mmol) of 4,4'-diaminodiphenyl ether (molecular weight: 200.24) and 21.85 g (7.4 mmol) of 3,3',4,4'-biphenyl tetracarboxylic dianhydride (molecular weight: 294.22) are added thereto. The content is stirred for 3 hours while the reaction temperature is maintained to be 50° C., and 18.02 g of N-methylmorpholine is added thereto at a rate of 18.6 ml/hr, thereby producing a low-molecular-weight aqueous polyimide precursor solution having a weight average molecular weight of less than 10,000.

Likewise, 131.57 g of a mixed solvent of water with NMP (water/NMP=65.78 g/65.78 g) is put into a flask equipped with a stirring rod and a thermometer. Then, 15.02 g (7.5 mmol) of 4,4'-diaminodiphenyl ether (molecular weight: 200.24) and 21.85 g (7.4 mmol) of 3,3',4,4'-biphenyl tetracarboxylic dianhydride (molecular weight: 294.22) are added thereto. The content is stirred for 24 hours while the reaction temperature is maintained to be 50° C., and 18.02 g of N-methylmorpholine is added thereto at a rate of 18.6 ml/hr, thereby producing an aqueous polyimide precursor solution having a weight average molecular weight of 10,000 or more.

These solutions are mixed with each other so as to produce a GPC peak area proportion shown in Table 1, thereby producing a polyimide precursor solution (PAA-6).

Production of Polyimide Precursor (PAA-7)

In place of 131.57 g of the mixed solvent of water with NMP (water/NMP=65.78 g/65.78 g), 131.57 g of a mixed solvent of water with NMP (water/NMP=52.63 g/78.94 g) is used. Furthermore, 15.88 g of dimethylaminoethanol is used instead of 18.02 g of N-methylmorpholine. Except for these changes, a polyimide precursor (PAA-7) is produced as in the production of the polyimide precursor (PAA-6).

Production of Polyimide Precursor (PAA-8)

In place of 131.57 g of the mixed solvent of water with NMP (water/NMP=65.78 g/65.78 g), 131.57 g of a mixed solvent of water with NMP (water/NMP=39.47 g/92.10 g) is used. Furthermore, 20.53 g of 4-hydroxymethylpiperidine is used instead of 18.02 g of N-methylmorpholine. Except for these changes, a polyimide precursor (PAA-8) is produced as in the production of the polyimide precursor (PAA-6).

Examples 9 to 11

Production of Polyimide Precursor (PAA-9)

Into a flask equipped with a stirring rod and a thermometer, 131.57 g of NMP is put. Then, 8.14 g (7.5 mmol) of p-phenylenediamine (PDA) (molecular weight: 108.14) and 21.85 g (7.4 mmol) of 3,3',4,4'-biphenyl tetracarboxylic dianhydride (molecular weight: 294.22) are added thereto. The content is stirred for 3 hours for dissolution and a reaction while the reaction temperature is maintained to be 50° C., thereby producing a low-molecular-weight polyimide precursor solution having a weight average molecular weight of less than 10,000.

Likewise, 131.57 g of NMP is put into a flask equipped with a thermometer. Then, 8.14 g (7.5 mmol) of p-phenylenediamine (molecular weight: 108.14) and 21.85 g (7.4 mmol) of 3,3',4,4'-biphenyl tetracarboxylic dianhydride (molecular weight: 294.22) are added thereto. The content is stirred for 24 hours for dissolution and a reaction while the reaction temperature is maintained to be 50° C., thereby producing a high-molecular-weight polyimide precursor solution having a weight average molecular weight of 10,000 or more.

These solutions are mixed with each other so as to produce a GPC peak area proportion shown in Table 1, thereby producing a polyimide precursor solution (PAA-9).

Production of Polyimide Precursor (PAA-10)

Except that 16.2 g of pyromelletic dianhydride (PMDA) is used in place of 21.85 g of 3,3',4,4'-biphenyl tetracarboxylic dianhydride, a polyimide precursor (PAA-10) is produced as in the production of the polyimide precursor (PAA-9).

Production of Polyimide Precursor (PAA-11)

Except that 23.8 g of benzophenone tetracarboxylic dianhydride (BTDA) is used in place of 21.85 g of 3,3',4,4'-biphenyl tetracarboxylic dianhydride, a polyimide precursor (PAA-11) is produced as in the production of the polyimide precursor (PAA-9).

Examples 12 and 13

Production of Polyimide Precursor (PAA-12)

Into a flask equipped with a stirring rod and a thermometer, 131.57 g of a mixed solvent of tetrahydrofuran with water (THF/water=118.41 g/13.16 g) is put. Then, 15.02 g (7.5 mmol) of 4,4'-diaminodiphenyl ether (molecular weight: 200.24) and 21.85 g (7.4 mmol) of 3,3',4,4'-biphenyl tetracarboxylic dianhydride (molecular weight: 294.22) are added thereto. The content is stirred for 3 hours for dissolution and a reaction while the reaction temperature is maintained to be 50° C., thereby producing a low-molecular-weight polyimide precursor solution having a weight average molecular weight of less than 10,000.

Likewise, 131.57 g of a mixed solvent of tetrahydrofuran with water (THF/water=118.41 g/13.16 g) is put into a flask equipped with a stirring rod and a thermometer. Then, 15.02 g (7.5 mmol) of 4,4'-diaminodiphenyl ether (molecular weight: 200.24) and 21.85 g (7.4 mmol) of 3,3',4,4'-biphenyl tetracarboxylic dianhydride (molecular weight: 294.22) are added thereto. The content is stirred for 24 hours for dissolution and a reaction while the reaction temperature is maintained to be 50° C., thereby producing a high-molecular-weight polyimide precursor solution having a weight average molecular weight of 10,000 or more.

These solutions are mixed with each other so as to produce a GPC peak area proportion shown in Table 1, thereby producing a polyimide precursor solution (PAA-12).

Production of Polyimide Precursor (PAA-13)

Except that 131.57 g of 1,3-dimethyl-2-imidazolidinone (DMI) is used in place of 131.57 g of mixed solvent of tetrahydrofuran with water, a polyimide precursor (PAA-13) is produced as in the production of the polyimide precursor (PAA-12).

Example 14

Production of Polyimide Precursor (PAA-14)

Into a flask equipped with a stirring rod and a thermometer, 131.57 g of NMP is put. Then, 15.02 g (7.5 mmol) of 4,4'-diaminodiphenyl ether (molecular weight: 200.24) and 21.85 g (7.4 mmol) of 3,3',4,4'-biphenyl tetracarboxylic dianhydride (molecular weight: 294.22) are added thereto. The content is stirred for 3 hours while the reaction temperature is maintained to be 50° C., and 18.02 g of N-methylmorpholine is added thereto at a rate of 18.6 ml/hr, thereby producing a low-molecular-weight aqueous polyimide precursor solution having a weight average molecular weight of less than 10,000.

Likewise, 131.57 g of NMP is put into a flask equipped with a stirring rod and a thermometer. Then, 15.02 g (7.5 mmol) of 4,4'-diaminodiphenyl ether (molecular weight: 200.24) and 21.85 g (7.4 mmol) of 3,3',4,4'-biphenyl tetracarboxylic dianhydride (molecular weight: 294.22) are added thereto. The content is stirred for 24 hours while the reaction temperature is maintained to be 50° C., and 18.02 g of N-methylmorpholine is added thereto at a rate of 18.6 ml/hr, thereby producing an aqueous polyimide precursor solution having a weight average molecular weight of 10,000 or more.

These solutions are mixed with each other so as to produce a GPC peak area proportion shown in Table 1, thereby producing a polyimide precursor solution (PAA-14).

Comparative Examples 1 and 2

Production of Polyimide Precursor (RPAA-1) and (RPAA-2)

Except that the solutions are mixed with each other so as to produce a GPC peak area proportion shown in Table 1, polyimide precursor solutions (RPAA-1) and (RPAA-2) are produced as in the production of the polyimide precursor solution (PAA-1).

Comparative Examples 3 and 4

Production of Polyimide Precursor (RPAA-3) and (RPAA-4)

Except that the solutions are mixed with each other so as to produce a GPC peak area proportion shown in Table 1, polyimide precursor solutions (RPAA-3) and (RPAA-4) are produced as in the production of the polyimide precursor (PAA-6).

Comparative Examples 5 and 6

The low-molecular-weight polyimide precursor solution obtained in the production of the polyimide precursor solution (PAA-1) is used as a polyimide precursor solution (RPAA-5). The high-molecular-weight polyimide precursor solution obtained in the production of the polyimide precursor solution (PAA-1) is used as a polyimide precursor solution (RPAA-6).

Evaluations

Surface Roughness and Uneven Coating

The produced polyimide precursor solutions are used to form films under the following conditions, thereby producing polyimide shaped articles. The formed films (polyimide shaped articles) are subjected to evaluations of (1) surface roughness and (2) uneven coating.

Conditions of Formation of Films

Application method: Bar coating with an application blade that is equipped with a spacer such that the thickness of the applied solution is 100 μm Application substrate: Glass plate having a thickness of 1.1 mm Drying temperature: 60° C.×10 minutes Heating temperature: 250° C.×30 minutes (1) Surface Roughness The surface of each of the films is analyzed with an optical microscope to evaluate the presence of roughness. The evaluation criteria are as follows.

A+: No roughness is found on the surface of the film

A: Roughness is slightly found on part of the surface of the film (less than 5% of the surface area of the film)

B: Roughness is found on part of the surface of the film

C: Roughness is found on approximately half the surface of the film

D: Roughness is found on substantially the entire surface of the film (2) Uneven Coating The surface of each of the film is analyzed with an optical microscope to evaluate the presence of unevenness. The evaluation criteria are as follows.

A+: No unevenness is found on the surface of the film

A: Unevenness is slightly found on part of the surface of the film (less than 5% of the surface area of the film)

B: Unevenness is found on part of the surface of the film

C: Unevenness is found on approximately half the surface of the film

D: Unevenness is found on substantially the entire surface of the film

Cracks and Elongation

The formed films (polyimide shaped articles) are punched in the shape of type-three dumb-bell test pieces. Each of the test pieces is placed on a tensile tester and subjected to a test under the following conditions to evaluate the occurrence of (3) cracks and (4) elongation at the edge of the film.

Test Conditions

Test equipment: Tensile tester type 1605, manufactured by Aikoh Engineering Co., Ltd.

Length of test piece: 40 mm

Width of test piece: 10 mm

Tensile speed: 10 mm/min

Applied load: 150 MPa (3) Cracks

A+: No cracks are found at the edge of the film (number of cracks: 0)

A: 1 to 5 cracks are found at the edge of the film

B: 6 to 10 cracks are found at the edge of the film

C: 11 to 30 cracks are found at the edge of the film (4) Elongation

A+: No elongation is found at the edge of the film (elongation rate: 0%)

A: Elongation that adversely affects properties is not found at the edge of the film (elongation rate: greater than 0% and less than 3%)

B: Elongation is found at the edge of the film (elongation rate: 3% or more and less than 5%)

C: Large elongation is found at the edge of the film (elongation rate: 5% or more)

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best

TABLE 1

| | | PI precursor solution | | | | | | | | | | |
|---|---|---|---|---|---|---|---|---|---|---|---|---|
| | | Solvent | | Components of PI precursor | | | GPC peak area | | Evaluations | | | |
| | No. | Type | Weight ratio (organic solvent/ water) | Acid anhydride | Diamine | Organic amine | a | b | Surface roughness | Unevenness | Cracks | Elongation |
| Example 1 | PAA-1 | NMP | 100/0 | BPDA | ODA | — | 0.70 | 0.30 | A | A | A | A+ |
| Example 2 | PAA-2 | NMP | 100/0 | BPDA | ODA | — | 0.90 | 0.10 | A+ | A+ | A+ | A+ |
| Example 3 | PAA-3 | NMP | 100/0 | BPDA | ODA | — | 0.98 | 0.02 | A+ | A+ | A+ | A |
| Example 4 | PAA-4 | NMP | 100/0 | BPDA | ODA | — | 0.95 | 0.05 | A+ | A+ | A+ | A |
| Example 5 | PAA-5 | NMP | 100/0 | BPDA | ODA | — | 0.72 | 0.28 | A | A+ | A+ | A+ |
| Example 6 | PAA-6 | Mixture of NMP and water | 50/50 | BPDA | ODA | MMO | 0.73 | 0.27 | A+ | A+ | A+ | A+ |
| Example 7 | PAA-7 | Mixture of NMP and water | 40/60 | BPDA | ODA | DMAEt | 0.75 | 0.25 | A+ | A+ | A+ | A+ |
| Example 8 | PAA-8 | Mixture of NMP and water | 30/70 | BPDA | ODA | HMP | 0.74 | 0.26 | A+ | A+ | A+ | A+ |
| Example 9 | PAA-9 | NMP | 100/0 | BPDA | PDA | — | 0.92 | 0.08 | A+ | A+ | A+ | A+ |
| Example 10 | PAA-10 | NMP | 100/0 | PMDA | PDA | — | 0.91 | 0.09 | A+ | A+ | A+ | A+ |
| Example 11 | PAA-11 | NMP | 100/0 | BTDA | PDA | — | 0.93 | 0.07 | A+ | A+ | A+ | A+ |
| Example 12 | PAA-12 | Mixture of THF and water | 90/10 | BPDA | ODA | — | 0.81 | 0.19 | A+ | A+ | A+ | A+ |
| Example 13 | PAA-13 | DMI | 100/0 | BPDA | ODA | — | 0.89 | 0.11 | A+ | A+ | A+ | A+ |
| Example 14 | PAA-14 | NMP | 100/0 | BPDA | ODA | MMO | 0.75 | 0.25 | A+ | A+ | A+ | A+ |
| Comparative Example 1 | RPAA-1 | NMP | 100/0 | BPDA | ODA | — | 0.65 | 0.35 | C | C | C | C |
| Comparative Example 2 | RPAA-2 | NMP | 100/0 | BPDA | ODA | — | 0.99 | 0.01 | B | B | C | C |
| Comparative Example 3 | RPAA-3 | Mixture of NMP and water | 50/50 | BPDA | ODA | MMO | 0.67 | 0.33 | B | B | C | C |
| Comparative Example 4 | RPAA-4 | Mixture of NMP and water | 50/50 | BPDA | ODA | MMO | 0.99 | 0.01 | B | B | C | C |
| Comparative Example 5 | RPAA-5 | NMP | 100/0 | BPDA | ODA | — | 0 | 1.00 | C | B | C | C |
| Comparative Example 6 | RPAA-6 | NMP | 100/0 | BPDA | ODA | — | 1.00 | 0 | C | B | C | B |

From the results shown in the table, the evaluation of cracks is better in Examples than in Comparative Examples. The evaluation of elongation is also better in Examples than in Comparative Examples.

The abbreviations in Table 1 are as follows.
PI: Polyimide
Diamine
  PDA: p-phenylenediamine
  ODA: 4,4'-diaminodiphenyl ether
Tetracarboxylic Dianhydride
  BPDA: 3,3',4,4'-biphenyl tetracarboxylic dianhydride
  PMDA: pyromelletic dianhydride
  BTDA: benzophenone tetracarboxylic dianhydride
Solvent
  NMP: N-methylpyrrolidone
  THF: tetrahydrofuran
  DMI: 1,3-dimethyl-2-imidazolidinone
Organic Amine Compound
  MMO: N-methylmorpholine
  DMAEt: dimethylaminoethanol
  HMP: 4-hydroxymethylpiperidine explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A polyimide shaped article that is a thermally cured product of a polyimide precursor solution,
   wherein a common logarithm value of a surface resistivity of an outer surface of the polyimide shaped article is 8 (Log Ω/□) to 13 (Log Ω/□),
   wherein the polyimide precursor solution comprises:
   a polyimide precursor;
   a solvent, the solvent including an organic solvent and a water, and a content of the water is from 10 weight % to 95 weight % relative to a total weight of the organic solvent and the water in the solvent;
   a tertiary amine compound; and
   a conductive filler, wherein the tertiary amine compound is at least selected from the group consisting of a tertiary amine compound having an aminoalkyl alcohol skeleton, a tertiary amine compound having a morpholine skeleton, and a tertiary amine compound having a piperidine skeleton, wherein the polyimide precursor is configured such that, in a case where the polyimide precursor is analyzed by gel permeation chromatography:

an elution curve of the polyimide precursor has a region A including a higher-molecular-weight peak and a region B including a lower-molecular-weight peak;

a weight average molecular weight determined from the region A in terms of polystyrene is approximately 10,000 or more, and a weight average molecular weight determined from the region B in terms of polystyrene is approximately less than 10,000; and when the area of the region A is a and the area of the region B is b, the polyimide precursor satisfies Equation (1):

$$a/(a+b) = \text{approximately from 0.70 to 0.81}, \quad \text{Equation 1}$$

wherein the weight average molecular weight of the whole polyimide precursor is from 50,000 to 200,000.

2. The polyimide shaped article according to claim 1, wherein a/(a+b) is approximately from 0.70 to 0.75 in Equation 1.

3. The polyimide shaped article according to claim 1, wherein the tertiary amine compound is at least one compound selected from the group consisting of dimethylaminoethanol, N-methylmorpholine, and 4-hydroxymethylpiperidine.

4. The polyimide shaped article according to claim 1, wherein a/(a+b) is approximately from 0.71 to 0.81 in Equation (1).

5. The polyimide shaped article according to claim 1, wherein a/(a+b) is approximately from 0.73 to 0.81 in Equation (1).

6. The polyimide shaped article according to claim 1, wherein the polyimide shaped article is a film.

7. The polyimide shaped article according to claim 1, wherein the polyimide shaped article is an endless belt.

8. The polyimide shaped article according to claim 1, wherein the weight average molecular weight of the whole polyimide precursor is from 50,000 to 130,000.

9. The polyimide shaped article according to claim 1, wherein the common logarithm value of the surface resistivity of the outer surface of the polyimide shaped article is 8 (Log $\Omega/\square$) to 12 (Log $\Omega/\square$).

10. The polyimide shaped article according to claim 1, wherein the polyimide shaped article consists of the thermally cured product of the polyimide precursor solution.

11. The polyimide shaped article according to claim 1, wherein the polyimide precursor solution optionally comprises a catalyst for promoting imidization, optionally comprises a levelling agent, and optionally comprises a filler for imparting mechanical strength.

12. The polyimide shaped article according to claim 11, wherein the polyimide shaped article consists of the thermally cured product of the polyimide precursor solution.

13. The polyimide shaped article according to claim 1, wherein the polyimide precursor solution consists of the polyimide precursor, the solvent, the tertiary amine compound, and the conductive filler.

14. The polyimide shaped article according to claim 1, wherein the polyimide precursor solution consists of the polyimide precursor, the solvent, the tertiary amine compound, the conductive filler, an optional catalyst for promoting imidization, an optional levelling agent, and an optional filler for imparting mechanical strength.

* * * * *